United States Patent
Pleines et al.

(10) Patent No.: US 7,272,003 B2
(45) Date of Patent: Sep. 18, 2007

(54) ENCAPSULATED SWITCHING DEVICES HAVING HEAT EMISSION ELEMENTS

(75) Inventors: Marianne Pleines, Winterthur (CH); Jean-Claude Mauroux, Hunzenschwil (CH); Martin Lakner, Birmenstorf (CH); Thomas Schoenemann, Schafisheim (CH); Xiangyang Ye, Künten (CH)

(73) Assignee: ABB Research Ltd, Zurich (CH)

( * ) Notice: Subject to any disclaimer, the term of this patent is extended or adjusted under 35 U.S.C. 154(b) by 42 days.

(21) Appl. No.: 10/913,465

(22) Filed: Aug. 9, 2004

(65) Prior Publication Data

US 2005/0063154 A1   Mar. 24, 2005

(30) Foreign Application Priority Data

Aug. 13, 2003   (EP) .................... 03405592

(51) Int. Cl.
H05K 7/20 (2006.01)
H02B 5/00 (2006.01)
H01H 33/02 (2006.01)

(52) U.S. Cl. .................. 361/690; 361/676; 361/605; 174/16.1; 20/155

(58) Field of Classification Search ............... 361/602, 361/604, 619, 676; 174/16.1, 16.3
See application file for complete search history.

(56) References Cited

U.S. PATENT DOCUMENTS

| | | | | |
|---|---|---|---|---|
| 5,995,368 A | * | 11/1999 | Lee et al. | 361/695 |
| 6,088,225 A | * | 7/2000 | Parry et al. | 361/704 |
| 6,236,562 B1 | | 5/2001 | Wilfert et al. | |
| 6,400,567 B1 | * | 6/2002 | McKeen et al. | 361/695 |
| 6,417,443 B1 | * | 7/2002 | Smith | 174/17 VA |
| 6,433,998 B2 | * | 8/2002 | Arioka et al. | 361/606 |
| 6,796,372 B2 | * | 9/2004 | Bear | 165/104.21 |
| 6,999,305 B1 | * | 2/2006 | Calcote | 361/601 |

FOREIGN PATENT DOCUMENTS

| | | | |
|---|---|---|---|
| EP | 1022830 A | | 7/2000 |
| EP | 1022831 A | | 7/2000 |
| GB | 2085238 A | | 4/1982 |
| JP | 2005032727 A | * | 2/2005 |

* cited by examiner

Primary Examiner—Boris Chervinsky
(74) Attorney, Agent, or Firm—Buchanan Ingersoll & Rooney PC

(57) ABSTRACT

The invention relates to an improvement to the thermal load capacity of generator switches (20, 21, 22). As is known, radiation plates (5, 50, 51, 52) are used between generator switches (20, 21, 22) for different phases (R, Y, B) for convective dissipation of radiated heat from adjacent encapsulation side walls (30b). According to the invention, in the vicinity of the encapsulation cover (3a) of a generator switch (20, 21, 22), the radiation plate (5, 50, 51, 52) has at least one angled metal sheet (50a) which is used to guide at least one air flow element (9) of the rising air flow (9) in the direction of the encapsulation cover (3a) and in order to direct the flow along the encapsulation cover (3a). Exemplary embodiments include: radiation plates (5, 50, 51, 52) electrically and thermally isolated from the housing (3); radiation plates (5, 50, 51, 52) with horizontally deflecting air guidance structures (51a, 51c) on the inner face (5a); angled metal sheet (50a) whose inclination is matched to a flattened area (30a) on the encapsulation cover (3a); angled metal sheet (50a) directed at cooling elements (6) on the encapsulation cover (3a). Advantages include: generator switches (20, 21, 22) with improved heat emission, increased rated current carrying capacity, and/or a more compact configuration.

27 Claims, 4 Drawing Sheets

ENCAPSULATED SWITCHING DEVICES HAVING HEAT EMISSION ELEMENTS

TECHNICAL FIELD

The invention relates to the field of primary technology for electricity generation and power distribution systems, in particular to switching devices for high currents or high voltages in high-voltage or medium-voltage systems. It is based on an apparatus for carrying and/or switching high currents or high voltages, by a switching device on an electrical system.

Various high-voltage switching devices and heavy-current switching devices are known from the prior art. In particular, encapsulated high current switches between a generator and a high-voltage transformer, so-called generator switches, are subject to very high thermal loads. The rating of encapsulated electrical equipment items is governed by the maximum permissible temperature. During operation at the rated current, this temperature must not be exceeded, thus limiting the maximum rated current of the switching device.

In the case of passive cooling, the heat produced during operation is emitted by thermal transport by means of convection, thermal conduction and thermal radiation to the environment. In three-phase arrangements with systems based on single-phase encapsulation, such as high current switching devices, the central phase is subject to more severe thermal loads than the other phases. In this case, heat emission by radiation through the side walls is impossible, since the encapsulation temperatures of the central phase and of the outer phases are similar. In the case of the central phase, the heat is emitted by convection and thermal conduction. In the case of the outer two phases, the heat can also be emitted completely on a side wall, that is to say via convection and radiation.

If the heat emission is increased, then the rated current carrying capacity of the equipment rises. Active air cooling systems with cooling units or air-conditioning units are known for this purpose. These have the disadvantage that there is a risk of the cooling system failing during operation, so that customer acceptance is poor.

EP 1 022 830 discloses a section of an electrical high-voltage system with active cooling means. The cooling means comprise two fans, which produce an air circulation within the encapsulation of a generator switch and thus improve the heat emission from the electrical conductor to the housing. In the case of generator switches in which three phases are arranged alongside one another, two chimney-like ducts are formed by adjacent encapsulation side walls, in which convection takes place, either naturally or with external fan assistance. In addition, thermal energy can be absorbed by the housing, by thermal conduction and thermal radiation, by means of one or two intermediate walls between adjacent encapsulation side walls, and can be dissipated upwards with the convective air flow. Intermediate walls with means to enlarge the surface areas are also disclosed, in order to improve the heat emission to the convection flow. In particular, intermediate walls with vertical longitudinal ribs or a structure with wide or narrow vertical corrugations are disclosed, which provide vertical extraction ducts.

DESCRIPTION OF THE INVENTION

The object of the present invention is to specify electrical equipment items for carrying and/or switching high currents and/or high voltages and an electrical high-voltage system with such equipment items, which are distinguished by an improved rating and/or a more compact configuration. According to the invention, this object is achieved by the features of the independent claims.

In a first aspect, the invention comprises a section of an electrical high-voltage system for carrying and/or switching high currents and/or high voltages, comprising electrical equipment items for at least three phases, with the equipment items being arranged in encapsulation and being covered by encapsulation covers, and adjacent encapsulations exchanging heat with one another via in each case at least one encapsulation side wall, with at least two intermediate plates furthermore being arranged between two encapsulation side walls and being used for heat absorption from at least one encapsulation side wall and for heat emission to an air flow which rises vertically between the encapsulation side walls, in which case at least one of the at least two intermediate plates is a flow-guiding radiation plate which has at least one angled sheet in an air outlet area in the vicinity of the encapsulation cover, in order to guide at least one air flow element or partial air stream of the rising air flow in the direction of at least one of the encapsulation covers and in order to direct the flow at or along the encapsulation cover. The encapsulations or housings are sufficiently close to one another to impede direct heat emission to the environment through the mutually facing housing side walls. The at least one flow-guiding radiation plate channelizes the vertical air flow according to the invention in the direction of the cover, which is thus cooled better. The heat emission by passive cooling is thus improved in a simple manner in the system section. The system can thus carry high operating currents, and/or may be designed to be smaller.

In another exemplary embodiment, the radiation plates are protected against heating by induction currents, which flow through the encapsulation, or against heating by thermal conduction, or they are additionally passively cooled by heat being passed on to the environment.

In yet another exemplary embodiment the angled sheet has an interlocking connection to the encapsulation cover or to an upper area of the encapsulation side wall in order to block a vertically rising inner air flow between the encapsulation side wall and the associated radiation plate. This embodiment provides an advantage in that the vertical inner air flow is blocked in order to prevent an incident flow by the more severely heated inner air flow, with only an incident flow by means of the cooler outer air flow being allowed.

Further exemplary embodiments provides that two radiation plates are arranged between two adjacent encapsulation side walls each having an inner face facing the associated encapsulation side wall, and an outer face facing the other radiation plate, and each radiation plate has an angled sheet which is angled towards the associated encapsulation side wall; and that in order to produce a horizontal inner air flow between the encapsulation side wall and at least one of the radiation plates, air guidance structures are provided on the inner face of the radiation plate in order to deflect the horizontal inner air flow to a side, and in order to produce a vertical outer air flow between the two radiation plates, swirling structures are provided on the outer face of at least one of the radiation plates in order to thoroughly mix the vertical outer air flow. These embodiments have the advantage that a pair of radiation plates allows a generally warmer inner air flow and a generally cooler outer air flow to be guided or carried independently of one another, so that an air flow which is as strong as possible and is at the same time as cool as possible is directed against the area of the encapsulation covers.

Additional embodiments provide an advantageous interaction between the radiation plates which guide the air flow and passive heat sinks on the housing cover of the equipment, and specify criteria for advantageous design and arrangement of the radiation plates.

The invention also relates to the radiation plates themselves, and to an electrical system comprising encapsulated equipment items having radiation plates according to the invention.

Further embodiments, advantages and applications of the invention will become evident from the dependent claims and from the description that now follows and the figures.

BRIEF DESCRIPTION OF THE DRAWINGS

Identical parts are provided with the same reference symbols in the figures.

APPROACHES TO IMPLEMENTATION OF THE INVENTION

Figure 1:
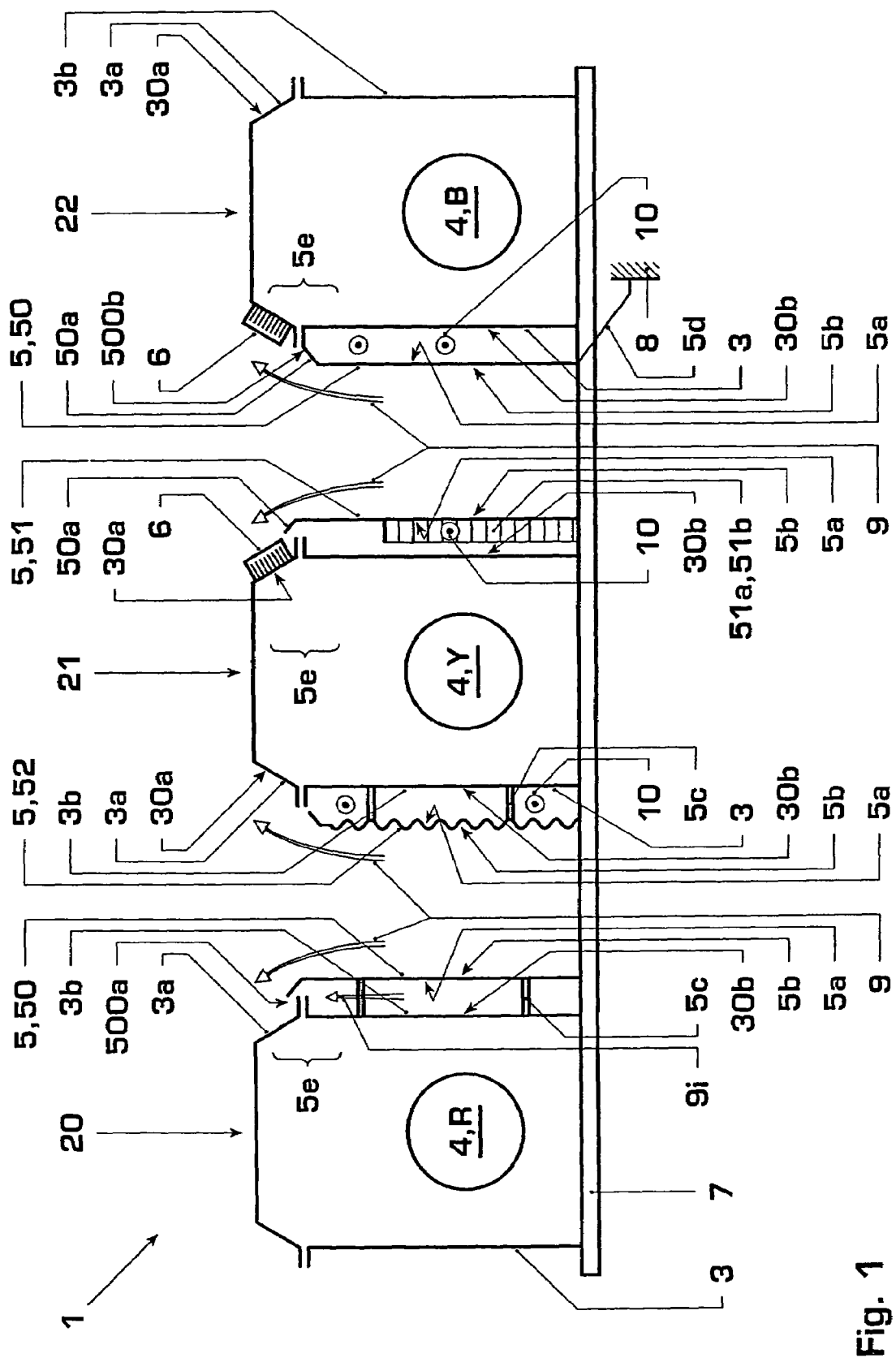
FIG. 1 shows a cross section through a 3-phase generator switch arrangement with radiation sheets, angled according to the invention, between the phases.

FIG. 1 shows a cross section through a section 1 of a 3-phase high-voltage or medium-voltage system having electrical equipment items 20, 21 and 22. A system such as this is suitable for transmission of high electrical power levels in the Megawatt to Gigawatt range. The currents and voltages which occur in this case are in the kA and kV range, respectively. A typical system comprises polyphase generator outgoers, in which operating currents between 5 and 30 kA and operating voltages of, for example, 10 to 36 kV occur in the individual phases R, Y, B. A high-voltage system such as this has sections 1 in which severe heating occurs as a consequence of the relatively high power losses. Contact junctions, such as switching points, are subject to considerable heating in the section 1. The heat which is formed in the inner conductor 4 is emitted to the outgoers by thermal conduction, and is emitted to the housing 3 by natural convection and radiation.

The equipment items 20, 21, 22 may thus be electrical apparatuses, switching devices, cables, lines, line sections or the like, which are typically loaded by high continuous currents at high voltages, and are correspondingly thermally heated. This relates in particular to high-voltage switching devices or heavy-current switching devices such as generator switches 20, 21, 22, which are illustrated by way of example. Each generator switch 20, 21, 22 comprises an inner conductor 4 for carrying current in one of the phases R, Y, B, and encapsulation 3 with an encapsulation cover 3a and an encapsulation lower part 3b which is, for example, in the form of a trough or is U-shaped. A reverse current flows via the encapsulation 3 to ground potential, by means of which the magnetic fields of the current through the inner conductor 4 are shielded from the outside. The generator switch phases 20, 21, 22 are arranged alongside one another on a pole frame 7.

In FIG. 1, two radiation plates 5, 50, 51, 52 are in each case arranged between mutually adjacent, and mutually at least partially facing, encapsulation side walls 30b. The radiation plates 5, 50, 51, 52 typically have a large-area extent parallel to the encapsulation side wall 30b, and are relatively thin along a connecting line between two adjacent encapsulations 3, 3 or phases R, Y, B. If there are three, and only three, phases R, Y, B, at least two and preferably only two radiation plates 5, 50, 51, 52 should in each case be arranged between the central phase Y and both outer phases R, B. No radiation plates are fitted to the outer walls of the outer phases R, B. Here, the heat exchange is ensured even without any radiation plates by radiation to the environment, since the ambient temperature is always lower than the temperature of the radiation plates. Radiation plates which are fitted to the outer faces of the outer encapsulation 3 could even act as a radiation shield, and could make the heat emission worse.

There is a chimney-like, vertically rising air flow 9, 9i between adjacent encapsulation side walls 30b, so that heat is passed on from the radiation plate 5 to the environment only by convection. The radiation plates 5 are at a lower temperature than the encapsulation side wall, since no current flows through them and they are heated only by radiation from the encapsulation side walls 30b, and are at the same time cooled by the convection 9, 9i, 10. A heat exchange process can thus take place by radiation from the side wall 30b in the direction of the radiation plate 5.

According to the invention, in an air outlet area 5e in the vicinity of the encapsulation cover 3a, the radiation plates 5 each have at least one angled sheet 50a in order to guide at least one air flow element 9 of the rising air flow 9 in the direction of at least one of the encapsulation covers 3a, in particular the associated or closest encapsulation cover 3a, and in order to direct the flow to this encapsulation cover 3a. The primary function of the radiation plates 5 is to increase the radiation exchange between two surfaces 30b at the same temperature, specifically the side walls 30b. The heat emission to the covers 3a to which the flow is directed is additionally improved by designing the radiation plates 5 as a flow-guiding element 5. Preferred exemplary embodiments will be discussed in the following text.

In order to avoid resistive heat losses in the radiation plate 5, 50, 51, 52 the radiation plate 5, 50, 51, 52 is electrically isolated from the encapsulation 3; 3a, 3b. The radiation plate 5, 50, 51, 52 is then generally also thermally isolated from the encapsulation 3. For this purpose, the radiation plate 5 is held on an encapsulation side wall 30b by means of an isolating spacer or mounting bolt 5c. A thermally conductive connection 5d is preferably made between the radiation plate 5 and a heat sink 8 outside the equipment items 20, 21, 22. The radiation plate 5 may have cooling ribs (not illustrated).

The radiation plates 5, 50, 51, 52 may be manufactured from any desired material, for example from metal and/or plastic. The radiation adsorption coefficient α should be high for infrared thermal radiation (IR radiation), for example α>0.9 or ideally α=1 for a black body radiator. A radiation plate 5, 50, 51, 52 composed of sheet aluminum which has been surface-treated and thus has a higher IR absorption coefficient is particularly suitable. For open-air applications, the surface should be white in order to minimize the heating caused by sunlight. In the case of a metal plate, the suspension should be electrically insulating. However, there should be a conductive connection to the encapsulation potential at least one point, for example by means of a metallic bolt, for potential bonding. In the case of a radiation plate 5, 50, 51, 52 composed of plastic, the suspension need be neither insulating nor need it provide potential bonding.

In order to block a vertically rising inner air flow 9i between the side wall 30b and the associated radiation plate 5, 50, the angled sheet 50a or angled metal sheet 50a may have an interlocking connection 500b to the encapsulation cover 3a or to an upper area 5e of the encapsulation side wall 30b (see phase B in FIG. 1).

As is shown in FIG. 1, two, and only two, radiation plates 5, 50, 51, 52 with angles 50a are advantageously arranged between two adjacent encapsulation side walls 30b. In this case, the angled sheets 50a may in each case be angled toward their associated encapsulation side wall 30b. The number of radiation plates 5, 50, 51, 52 governs the heat that is emitted from the system. By calculation, the heat emission can be increased by 23% by installing two radiation plates rather than one. It is also possible to fit more than two radiation plates 5, 50, 51, 52 between two encapsulations 3, 3. Central radiation plates may be designed without angled sheets. Optimization calculations have, however, shown that it is sufficient for heat emission for two, and only two, radiation plates 5, 50, 51, 52 to be fitted between two phases, R, Y; Y, B.

The arrangement of two radiation plates 5, 50, 51, 52 makes it possible to ensure that the cooler air between the radiation plates 5, 50, 51, 52 is diverted toward the encapsulation cover 3a, and that warmer air 10 between each radiation plate 5, 50, 51, 52 and the associated encapsulation side wall 30b does not rise, but flows away forward and/or to the rear along the radiation plate 5, 50, 51, 52. The radiation plates 5, 50, 51, 52 can be chosen to have a suitable height to width ratio for this purpose. Two radiation plates 5, 50, 51, 52 are typically essentially arranged parallel to one another. They each have an inner face 5a facing the associated encapsulation side wall 30b and an outer face 5b facing the other radiation plate 5, 50, 51, 52. In order to produce a horizontal inner air flow 10 between the encapsulation side wall 30b and at least one of the radiation plates 5, 51, 52, air guidance structures 51a can be provided on the inner face 5a of the radiation plate 5, 51, 52 for lateral deflection of the inner air flow 10 in the horizontal direction.

Figure 2B:
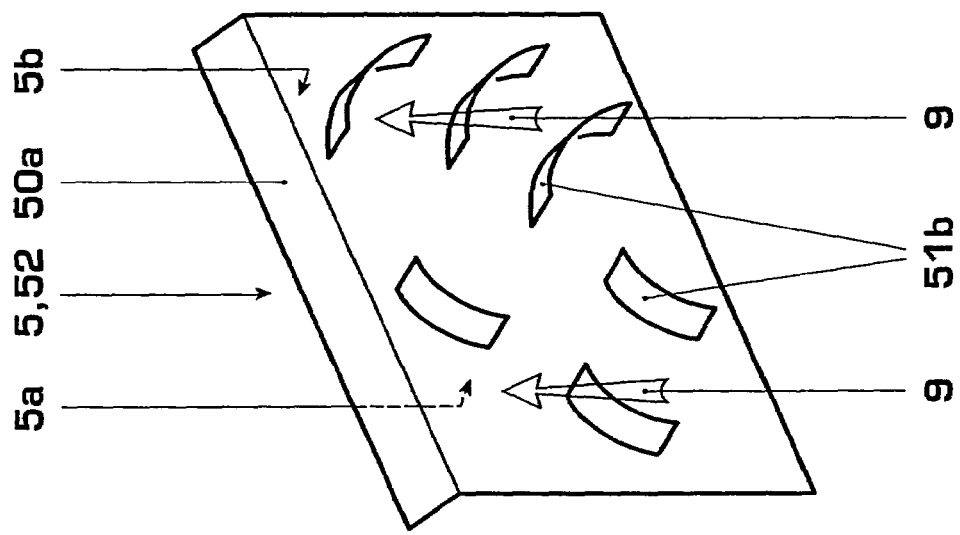
FIGS. 2a-2d show exemplary embodiments of the radiation sheets.
Figure 2A:
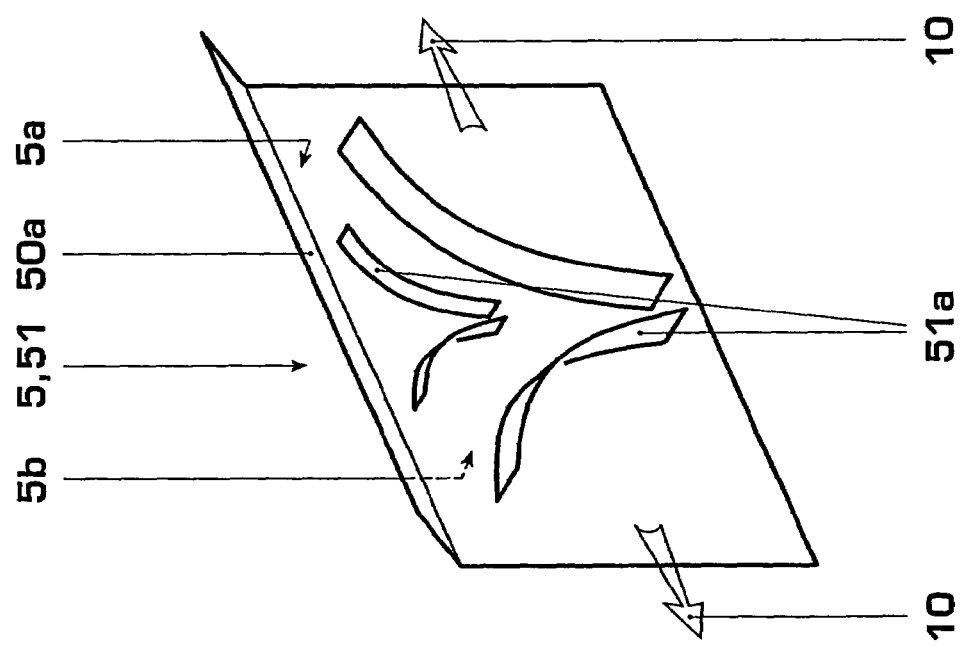

Deflection sheets 51a, e.g. deflection metal sheets 51a, which are in the form of vanes and are bent sideways are illustrated for this purpose in FIG. 2a. The deflection sheets 51a assist an outlet flow forward and/or to the rear even if the height to width ratio of the radiation plates 5, 50, 51, 52 is poor. Alternatively or additionally, swirling structures 51b, 51c may be provided on the outer face 5b of at least one of the radiation plates 5, 51, 52 in order to produce a turbulent vertical outer air flow 9 between the two radiation plates 5, 51, 52, in order to thoroughly mix the vertical outer air flow 9. Short vane sheets 51b, e.g. short metal vane sheets 51b, which are preferably oriented randomly and are arranged randomly, are shown for this purpose in FIG. 2b. FIG. 2c shows a horizontally corrugated sheet 51c, e.g. a horizontally corrugated metal sheet 51c, which is likewise used for swirling and thorough mixing of the vertical outer air flow 9. The horizontally corrugated structures 51c may also be provided on the inner face 5a of the radiation plates 5, 52. Turbulence improves the convective heat dissipation.

The encapsulation cover 3a preferably has a flattened area 30a in an edge area above the encapsulation side wall 30b, with the angled sheet 50a being arranged such that it is essentially aligned with the flattened area 30a. The flattened area is advantageously oriented at an angle of 45±10° between a horizontal extension of the cover 3a or of a cover upper part and a vertical extension of the encapsulation side wall 30b. Passive cooling elements 5 may likewise be arranged on the encapsulation cover 3a, in particular on the flattened area 30a, onto which the rising air flow element 9 which is guided by the radiation plates 5, 50, 51, 52 can be directed.

Figure 2D:
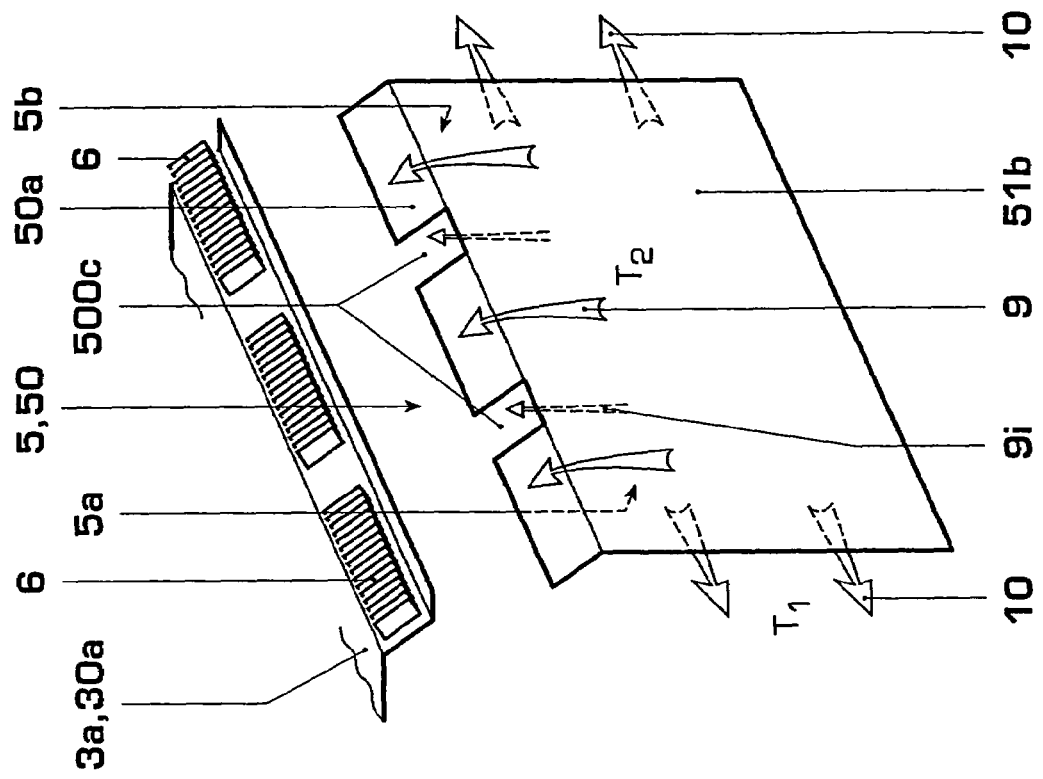
Figure 2C:
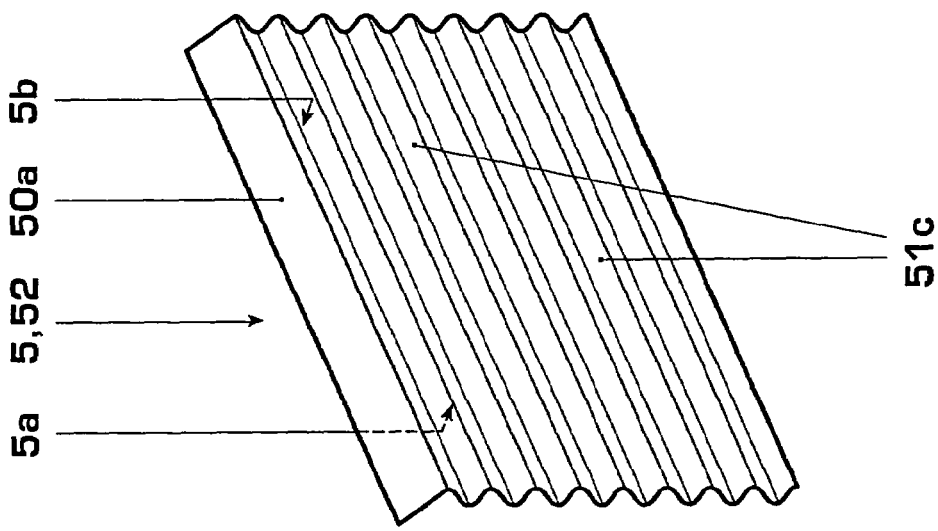

As is shown in FIG. 2d, the angled sheet 50a may have recesses 500c on one air-guiding outer edge, in those areas where there are no cooling elements 6 on the encapsulation cover 3a, in order to allow the vertically rising air flow 9i to pass through there without any impediment. Furthermore, the cooling elements are preferably cooling ribs 6, which are arranged on vertical planes. $T_1$ denotes the temperature of the warmer inner air flow 10, 9i and $T_2$ the temperature of the less hot outer air flow 9. In general, temperature differences of up to 10° C. may occur between $T_1$ and $T_2$.

Figure 3:
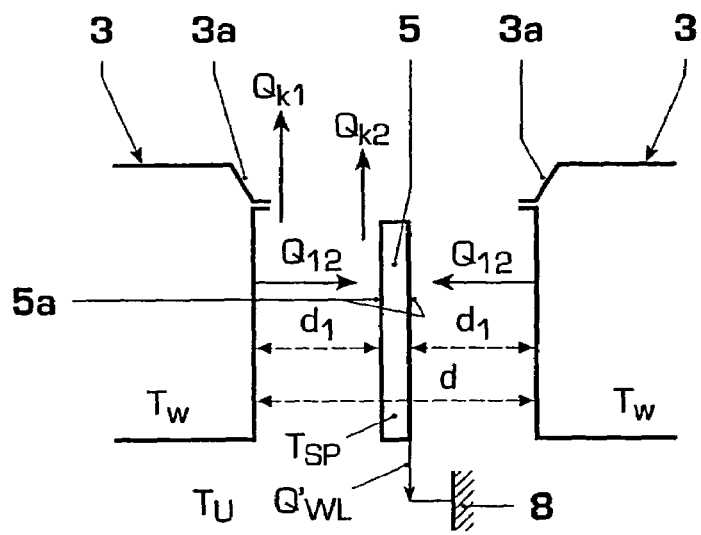
FIGS. 3, 4 show schematic illustrations of the thermal balance with one radiation sheet or two radiation sheets between two phases.
Figure 4:
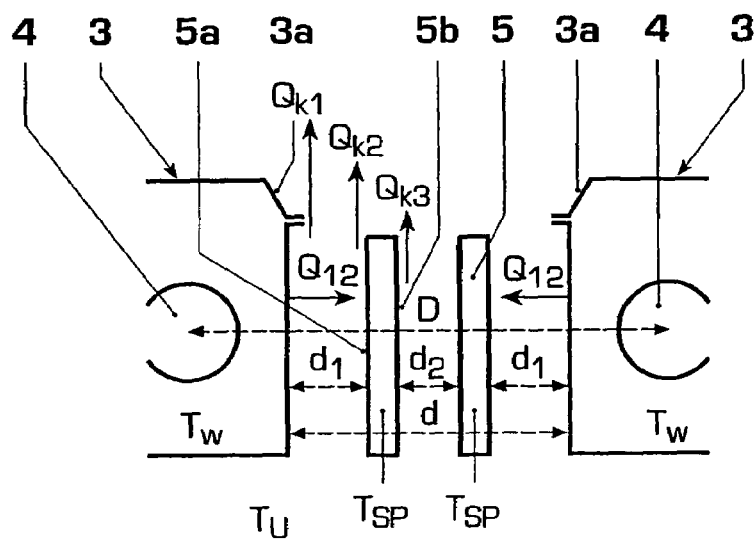

FIGS. 3 and 4 schematically show the thermal balance when using one radiation plate 5 or two radiation plates 5. In this case, d is the distance between adjacent encapsulation side walls 30b, D is the pole separation, $Q_{k1}$ is the convective heat emission from the side wall 30b, $Q_{k2}$ is the convective heat emission from the inner face 5a of the radiation plate 5, $Q_{k3}$ is the convective heat emission from the outer face 5b of the radiation plate 5, $Q_{12}$ is the radiation heat emission from the side wall 30b to the radiation plate 5, $Q_{WL}'$ is the thermal conduction heat emission from the radiation plate 5 to the environment or to the heat sink 8, $T_{SP}$ is the radiation plate temperature, $T_U$ is the ambient temperature and $T_W$ is the side wall temperature. Typical permissible limit temperature values are 105° C. at contact points of the inner conductor 4, 90° C. on the inner conductor 4 for dissipation, and $T_W$=70° C. encapsulation temperature. The ambient temperature $T_U$ may be assumed, for example, to be 40° C. Theoretical calculations have shown that the radiation plates 5 lead to a temperature reduction of up to 2° C. on the inner conductor 4. Experimentally, 1.5° C. has been verified. The radiation plates 5, 50, 51, 52 according to the invention not only reduce the temperature of the inner conductor 4, but likewise reduce the temperature $T_W$ of the encapsulation side wall 30b. The maximum permissible rated current for the generator switch type under consideration can thus be increased without active cooling.

Figure 5:
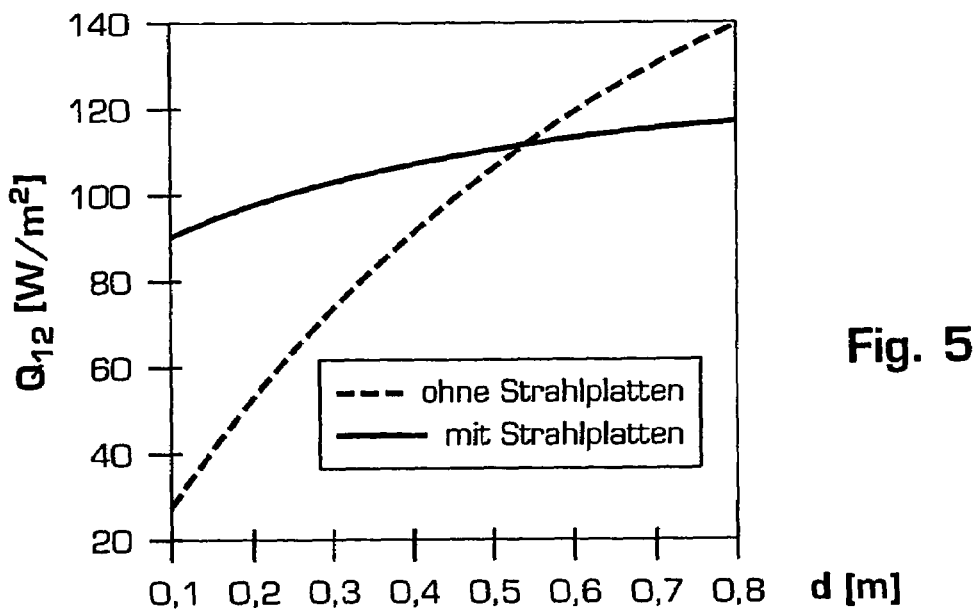
FIG. 5 shows calculations of the thermal balance with and without a radiation sheet.

FIG. 5 shows the resultant emitted amount of heat $Q_{12}$ per unit area of the side wall 30b, as a function of the distance d between adjacent side walls 30b, for the arrangement shown in FIG. 4 with two radiation plates 5 or without any radiation plates 5. For distances d<55 cm, corresponding to a pole separation of D<1620 mm, the radiated heat emission is considerably improved by the radiation plate 5, 50, 51, 52. The radiation plates 5, 50, 51, 52 should be fitted only when there is no longer a sufficient spatial angle for a surface at the ambient temperature or, in general, a temperature lower than the wall temperature $T_W$ to be visible from the encapsulation side wall 30b between two phases R, Y, B. The fitting of the radiation plates 5, 50, 51, 52 is thus dependent on the phase or pole separation D. There is a minimum pole separation D, beyond which there is no need for the radiation plates. If the distance between two radiation plates is no longer small in comparison to the dimensions, then sufficient heat can be emitted by radiation to the background. Since the ambient temperature $T_U$ is always lower than the temperature of the radiation plates $T_{SP}$, any radiation plates fitted would likewise act as a radiation shield.

On the other hand, the distance $d_1$ between the radiation plate 5, 50, 51, 52 and the encapsulation side wall 30a or a distance $d_2$ between the radiation plates 5, 50, 51, 52 should be chosen to be sufficiently large to allow a free boundary layer flow 9, 9i, 10 to be formed. The calculated minimum separation including a safety margin is 40 mm. If the radiation plates 5, 50, 51, 52 are too close together, the poorer convection means that it is impossible for any optimum heat transmission to be formed. Furthermore, the radiation plates 5, 50, 51, 52 should be mounted between the encapsulation side walls 30b so as not to significantly impede the convective air flow 9, 9i, 10.

The invention also covers a radiation plate 5, 50, 51, 52 itself, as described above, and in particular a radiation plate 5, 50, 51, 52 for a system section 1 and for an electrical switchgear assembly, in particular a high-voltage or medium-voltage switchgear assembly, with a system section 1 such as this, as described above. The invention allows equipment items 20, 21, 22 to be operated at higher rated currents, and/or system sections 1 to be designed to be more compact.

LIST OF REFERENCE SYMBOLS

1 3-phase generator switch, encapsulated electrical equipment carrying continuous current
20,21,22 Generator switch, switching device, phases; R, Y, B
3 Housing, encapsulation, induction current conductor
3a Encapsulation cover
30a Flattened area on the encapsulation cover
3b Encapsulation lower part, trough
30b Encapsulation side wall facing the adjacent phase
4 Inner conductor, heavy-current conductor
5,50,51,52 Radiation plate with angled sheet
5a Inner face of the radiation plate
5b Outer face of the radiation plate
5c Insulating mounting bolt, spacer
5d Thermally conductive connection to a heat sink
5e Upper area of the radiation plate, air outlet area
50 Radiation plate without air guidance structures
50a Angle, angled sheet, angled metal sheet, incident flow sheet
500b Interlocking connection
500c Recesses
51 Radiation plate with air guidance sheets
52 Radiation plate with swirling sheets
51a Side deflection sheet, two-vane sheet
51b Swirling sheets, single-vane sheet
51c Air guidance sheets, swirling sheet
6 Cooling ribs
7 Pole frame, mounting frame
8 Heat sink
9, 9i Vertical air flow
10 Horizontal air flow
$d, d_1, d_2$ Distances between encapsulation side walls and/or radiation plates
D Pole separation, distance between the phases
$Q_K, Q_{k1}, Q_{k2}, Q_{k3}$ Convective heat emission
$Q_{12}$ Radiated heat emission, amount of heat radiated per unit area of the side wall
$Q_{WL}'$ Thermal conduction heat emission
$T_1, T_2$ Air temperatures
$T_{SP}$ Radiation plate temperature
$T_U$ Ambient temperature
$T_W$ Wall temperature

The invention claimed is:

1. A section of an electrical high-voltage system for carrying at least one of high currents, and high voltages, and switching at least one of high currents, and high voltages comprising:
   encapsulations having encapsulation covers and encapsulation side walls, wherein adjacent encapsulations exchange heat via at least one encapsulation side wall, wherein passive cooling elements are arranged on the encapsulation covers;
   electrical apparatuses for at least three phases, each being arranged in an encapsulation; and
   at least two intermediate plates arranged between the encapsulation side walls of adjacent encapsulations and being used to absorb heat from at least one encapsulation side wall and to emit heat via rising airflow between the encapsulation side walls,
   wherein at least one of the intermediate plates is a flow-guiding radiation plate, which has at least one angled sheet in an air outlet area located in the vicinity of the encapsulation covers for guiding at least one partial air stream of the rising airflow towards at least one of the encapsulation covers and for flowing the at least one partial air stream against the passive cooling elements which are arranged on the encapsulation covers.

2. The system section as claimed in claim 1, wherein
   a) the radiation plate is electrically isolated from the encapsulation to avoid resistive losses, and wherein equipotential bonding is provided, and
   b) the radiation plate is thermally isolated against heat conduction from the encapsulation.

3. The system section as claimed in claim 1, wherein the angled sheet has a form-fit connection to the encapsulation cover or to an upper area of the encapsulation side wall in order to block a vertically rising inner air flow between the encapsulation side wall and the associated radiation plate.

4. The system section as claimed in claim 1, wherein
   a) two radiation plates are arranged between two adjacent encapsulation side walls, which radiation plates each have inner face, facing the associated encapsulation side wall, and an outer face, facing the other radiation plate, and
   b) each radiation plate has an angled sheet which is angled towards the associated encapsulation side wall.

5. The system section as claimed in claim 4, wherein
   a) in order to produce a horizontal inner air flow between the encapsulation side wall and at least one of the radiation plates, air guidance structures are provided on the inner face of the radiation plate to deflect the horizontal inner air flow laterally and
   b) in order to produce a vertical outer air flow between the two radiation plates, swirling structures are provided on the outer face of at least one of the radiation plates to thoroughly mix the vertical outer air flow.

6. The system section as claimed in claim 4, wherein in order to produce a horizontal inner air flow between the encapsulation side wall and at least one of the radiation plates, air guidance structures are provided on the inner face of the radiation plate to deflect the horizontal inner air flow laterally.

7. The system section as claimed in claim 4, wherein in order to produce a vertical outer air flow between the two radiation plates, swirling structures are provided on the outer face of at least one of the radiation plates to thoroughly mix the vertical outer air flow.

8. The system section as claimed in claim 1, wherein
a) the encapsulation covers have a flattened area in an edge area above the encapsulation side walls, and respective angled sheets are essentially aligned with the flattened area, and
b) the passive cooling elements are arranged on a flattened area of the encapsulation covers.

9. The system section as claimed in claim 8, wherein
a) the angled sheets have recesses at an air-guiding outer edge in those areas where no cooling elements are present on the encapsulation covers, in order to avoid impeding the vertically rising air flow, and
b) cooling elements which are arranged on the encapsulation covers have cooling ribs which are arranged in vertical planes.

10. The system section as claimed in claim 8, wherein the angled sheets have recesses at an air-guiding outer edge in those areas where no cooling elements are present on the encapsulation covers, in order to avoid impeding the vertically rising air flow.

11. The system section as claimed in claim 8, wherein cooling elements which are arranged on the encapsulation covers have cooling ribs which are arranged in vertical planes.

12. The system section as claimed in claim 1, wherein
a) a sufficient separation is chosen between the radiation plates and the associated encapsulation side walls, or between the radiation plates, or between the radiation plates and the associated encapsulation side walls and between the radiation plates, such that a free boundary layer flow can be formed.

13. The system section as claimed in claim 1, wherein the radiation plates are metal plates, having an electrically insulating suspension.

14. The system section as claimed in claim 13, wherein the radiation plates are white-colored aluminum metal sheets.

15. The system section as claimed in claim 1, wherein cooling elements which are arranged on the encapsulation covers have cooling ribs which are arranged on vertical planes.

16. The system section as claimed in claim 1, wherein two radiation plates are arranged between the central phase and each of the two outer phases.

17. The system section as claimed in claim 1, wherein the electrical apparatuses are high-current circuit breakers and in particular generator circuit breakers, or are high-voltage circuit breakers.

18. The system section as claimed in claim 1, wherein the radiation plate is electrically isolated from the encapsulation to avoid resistive losses, and wherein equipotential bonding is provided.

19. The system section as claimed in claim 1, wherein the radiation plate is thermally isolated against heat conduction from the encapsulation.

20. The system section as claimed in claim 1, wherein the radiation plate is thermally connected to a heat sink for additional heat removal by heat conduction.

21. The system section as claimed in claim 1, wherein the encapsulation covers have a flattened area in an edge area above the encapsulation side walls, and respective angled sheets are arranged essentially aligned with the flattened area.

22. The system section as claimed in claim 1, wherein the passive cooling elements are arranged on a flattened area of the encapsulation covers.

23. The system section as claimed in claim 1, wherein the radiation plates are mounted between the encapsulation side walls so as not to significantly impede a convective air flow.

24. The system section as claimed in claim 1, wherein the radiation plates are plastic panels.

25. A radiation plate in a section of an electrical high voltage system having encapsulations with corresponding encapsulation covers, the radiation plate comprising:
at least one angled sheet in an air outlet area located in the vicinity of the a encapsulation covers for guiding at least one partial air stream of the rising airflow towards at least one of the encapsulation covers and for flowing the at least one partial airstream against the encapsulation cover.

26. An electrical system having a system section, the system section comprising:
encapsulations having encapsulation covers and encapsulation side walls, wherein adjacent encapsulations exchange heat via at least one encapsulation side wall;
passive cooling elements arranged on the encapsulation covers;
electrical apparatuses for at least three phases, each being arranged in an encapsulation; and
at least two intermediate plates arranged between the encapsulation side walls of adjacent encapsulations and being used to absorb heat from at least one encapsulation side wall and to emit heat via rising airflow between the encapsulation side walls,
wherein at least one of the intermediate plates is a flow-guiding radiation plate which has at least one angled sheet in an air outlet area located in the vicinity of the encapsulation covers for guiding at least one partial air stream of the rising airflow towards at least one of the encapsulation covers and for flowing the at least one partial air stream against the passive cooling element that is arranged on the encapsulation cover.

27. The electrical system as claimed in claim 26, wherein the system is a high-voltage or medium-voltage switchgear assembly.

* * * * *